Figure 1:
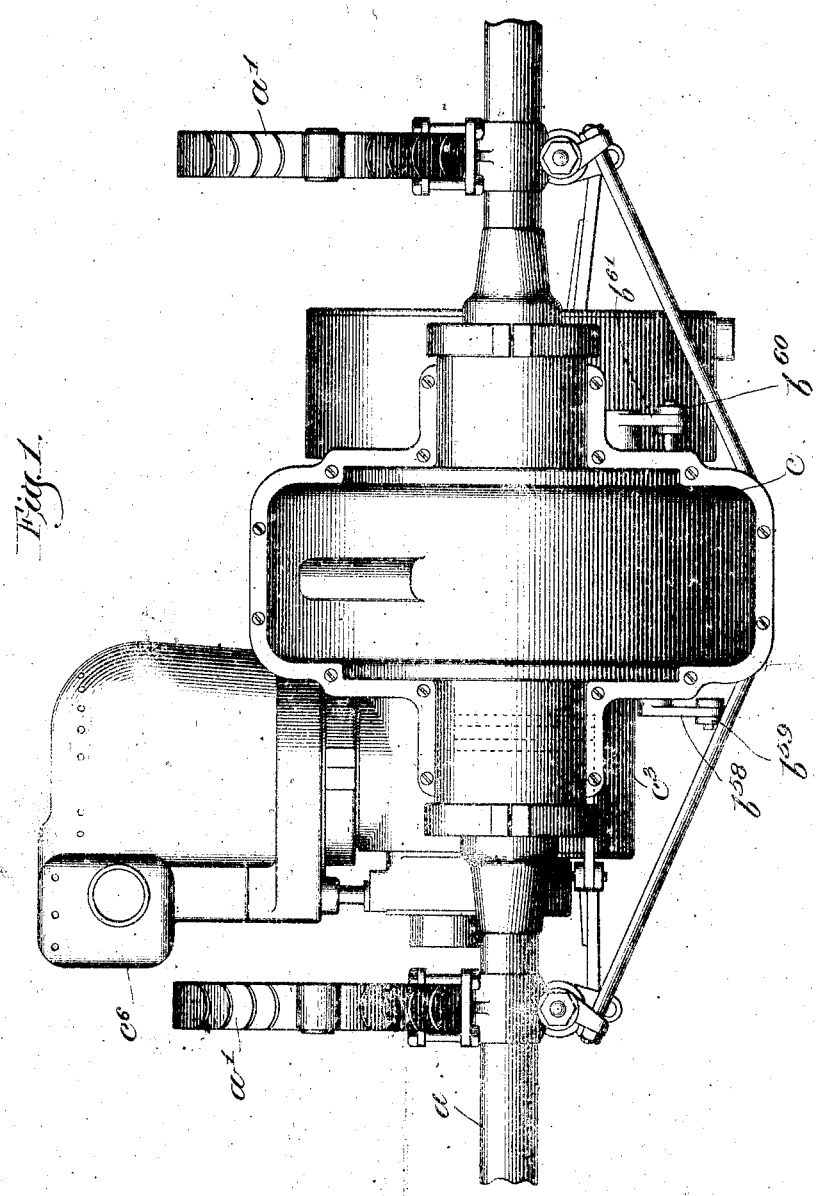

No. 883,735. PATENTED APR. 7, 1908.
A. B. MORSE.
DRIVING MECHANISM FOR MOTOR CARRIAGES.
APPLICATION FILED SEPT. 26, 1903.

5 SHEETS—SHEET 1.

No. 883,735. PATENTED APR. 7, 1908.
A. B. MORSE.
DRIVING MECHANISM FOR MOTOR CARRIAGES.
APPLICATION FILED SEPT. 26, 1903.

5 SHEETS—SHEET 3.

Witnesses.
Thomas Drummond
William Lutton

Inventor.
Alfred B. Morse,
by Crosby & Gregory
Attys.

No. 883,735. PATENTED APR. 7, 1908.
A. B. MORSE.
DRIVING MECHANISM FOR MOTOR CARRIAGES.
APPLICATION FILED SEPT. 28, 1903.

5 SHEETS—SHEET 4.

Witnesses:
Thomas Drummond
S. William Lutton

Inventor
Alfred B. Morse,
by Crosby Gregory
Attys.

No. 883,735. PATENTED APR. 7, 1908.
A. B. MORSE.
DRIVING MECHANISM FOR MOTOR CARRIAGES.
APPLICATION FILED SEPT. 26, 1903.

5 SHEETS—SHEET 5.

Witnesses.
Thomas A. Drummond,
William Lutton.

Inventor.
Alfred B. Morse,
by Crosby Gregory.
Attys.

UNITED STATES PATENT OFFICE.

ALFRED B. MORSE, OF SOUTH EASTON, MASSACHUSETTS.

DRIVING MECHANISM FOR MOTOR-CARRIAGES

No. 883,735.  Specification of Letters Patent.  Patented April 7, 1908.

Application filed September 26, 1903. Serial No. 174,782.

*To all whom it may concern:*

Be it known that I, ALFRED B. MORSE, a citizen of the United States, and residing at South Easton, county of Bristol, State of Massachusetts, have invented an Improvement in Driving Mechanism for Motor-Carriages, of which the following description, in connection with the accompanying drawings, is a specification, like letters on the drawings representing like parts.

My invention is an improvement in the driving mechanism of automobiles, being particularly intended for gas engines, although not restricted thereto.

Among the objects of my invention are the centralization of the moving parts about the driving axle, driving the same frictionally, having a dust and oil proof casing therefor, and also preferably a connected casing for all the mechanism, permitting oiling the parts in common and also minimizing the possibility of oil escaping, besides other objects which will appear more at length later on.

Referring further to the first mentioned object of my invention, it is well to note that a motor carriage requires not only strength but noiselessness, compactness, durability, lightness and simplicity, and all these requirements must be found in one and the same mechanism, so that the problem is far from simple; and in my present invention I have aimed to secure these objects by using a frictional clutch located at the axle.

The change speed gears, reverse gear and brake, besides the clutch mechanism, all encircle the driving axle, thereby doing away with those parts and arrangements which heretofore have tended to jar the body of the vehicle and also produce noise and other complications, and also leaving the body of the vehicle unweighted and unoccupied. Also this construction gives smoothness and ease of running, besides noiselessness, and renders it extremely easy for the user to operate the controlling levers.

A further feature of my invention resides in providing a large frictional surface for the driving engagement, the engaging surfaces thereof being of different materials so as to maintain smoothness of operation and secure great durability and prevent the roughening and rapid wearing out of the frictional device.

Further constructional details, advantages, and the operation thereof will be pointed out in the course of the following description, reference being had to the accompanying drawings in which I have illustrated a preferred embodiment of my invention, and the latter will be more particularly defined in the appended claims also forming a part of this specification.

Figure 2:
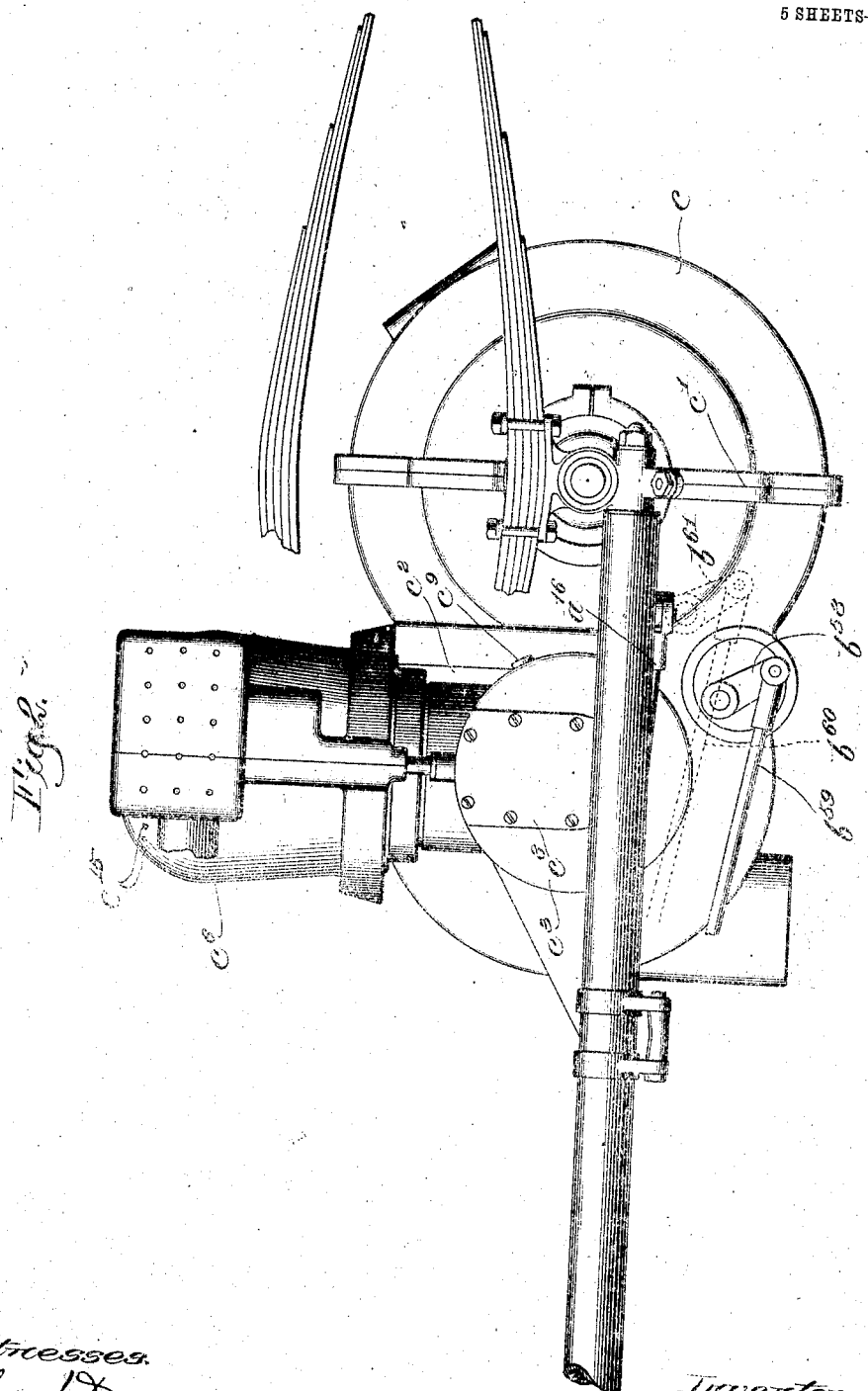
Figure 3:
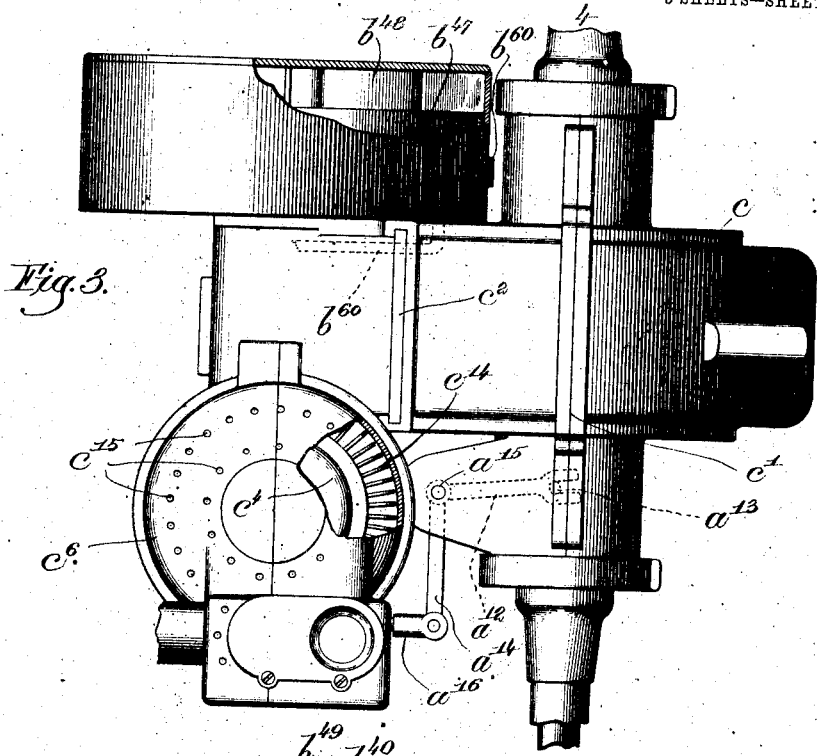
Figure 4:
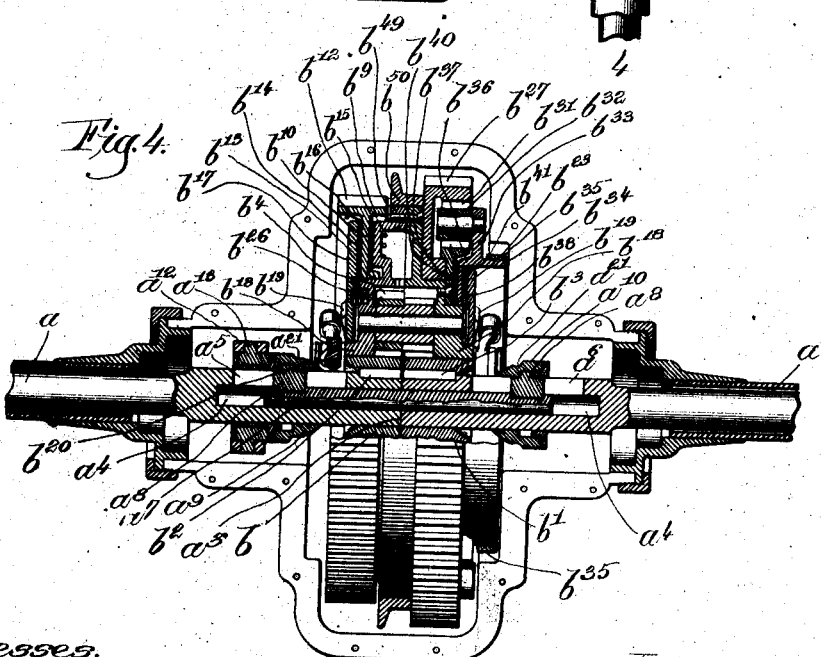
Figure 5:
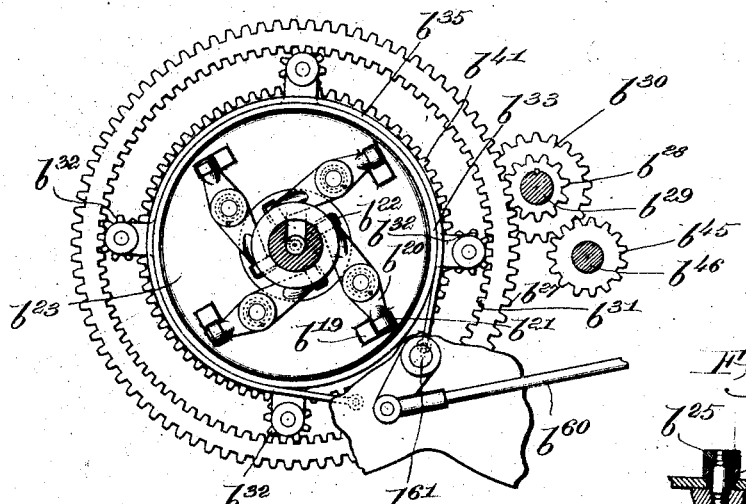
Figure 8:
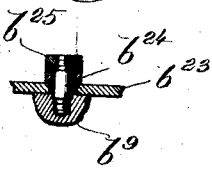
Figure 6:
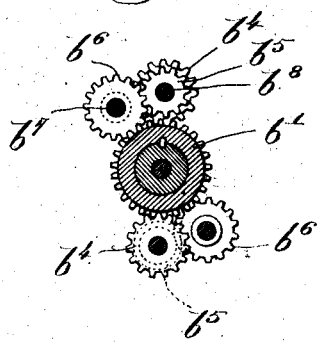
Figure 7:
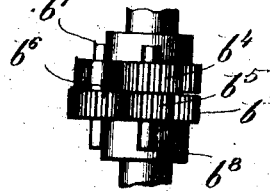
Figures 9, 10:
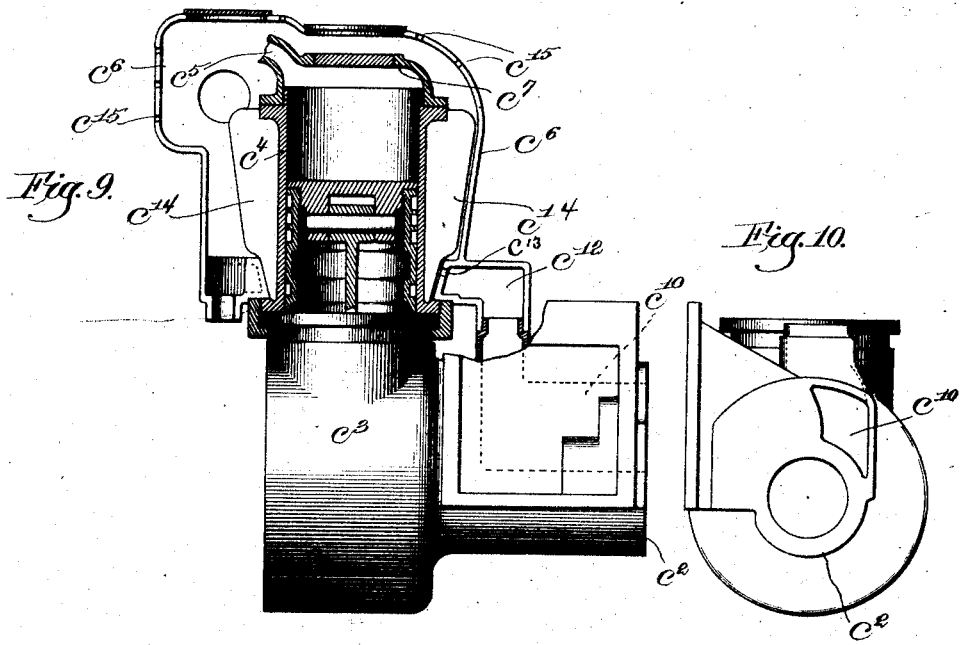
Figure 11:
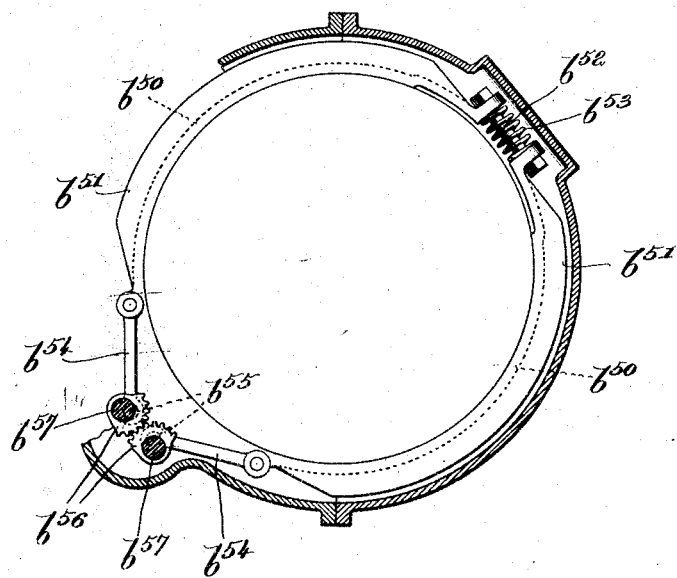

In the drawings Figure 1 shows in rear elevation my apparatus as applied to the driving axle of a vehicle. Fig. 2 is a left hand side elevation thereof. Fig. 3 is a top plan view thereof. Fig. 4 is a vertical longitudinal section taken on the line 4—4, Fig. 3, parts being broken away for clearness of illustration. Fig. 5 is a cross sectional detail showing the clutch and gearing in side elevation. Fig. 6 is a sectional view of the differential gearing. Fig. 7 is a top plan view thereof. Fig. 8 is a sectional detail to be referred to. Fig. 9 is a broken detail partly in section showing the construction of the case for the cooling device and details of the engine. Fig. 10 is an end view of the intermediate gear case. Fig. 11 is a sectional view showing the brake in side elevation.

In the drawings I have not undertaken to show the general details of the vehicle itself inasmuch as my mechanism is applicable to any driving shaft or axle $a$ adapted to support the body of the vehicle on usual springs $a'$.

Referring more particularly to Figs. 4 to 8, it will be seen that the shaft $a$ is split or separated into two parts at $a^3$ and provided with an axial hole or recess $a^4$ having slots $a^5$, $a^6$ opening outwardly.

Within the recess $a^4$ is a slide-rod or connecting bar $a^7$ shouldered at its opposite ends to receive opposite lugs $a^8$ to engage and operate conical spreaders $a^9$, $a^{10}$ for actuating the clutch mechanism and themselves moved by a fork $a^{12}$ on a collar $a^{13}$ encircling the shaft $a$ at the left hand side of the gearing, Fig. 4. The fork $a^{12}$ is carried at the free end of a bell crank lever $a^{14}$, shown in Figs. 1 and 3, pivoted at $a^{15}$ and connecting with an operating rod $a^{16}$ at its outer free end.

Adjacent the split ends of the shaft $a$ are mounted two gears $b$, $b'$ keyed thereto at $b^2$, $b^3$. In mesh with the gear $b$ is a pinion $b^4$ which drives a pinion $b^5$, the latter in turn driving a pinion $b^6$, see Figs. 6 and 7, meshing with the gear $b'$. Two sets of the aforesaid differential gearing are provided for the sake of even running, said sets being mounted diametrically opposite each other, as shown in Fig. 6, where they are similarly lettered. The shafts $b^7$, $b^8$ of the gears $b^4$—$b^3$ are mounted in a housing or gear carrier $b^9$ which acts as a power transmitter for driving the shaft $a$, being journaled for compactness on the projecting ends of the gears $b$, $b'$, as clearly shown in Fig. 4. This power transmitter $b^9$ is provided on one face and preferably adjacent its periphery with a flat frictional driving surface as indicated at $b^{10}$ for giving a large engaging surface for high speed. Adjacent thereto is a high speed driving gear $b^{12}$ loosely mounted on an annular projection $b^{13}$ of the power transmitter or carrier $b^9$ and having the opposite faces of its web $b^{14}$ ground flat to provide frictional engaging surfaces for driving the vehicle, annular plates or disks $b^{15}$, $b^{16}$ of indurated fiber or equivalent material being provided loosely at opposite sides of said web $b^{14}$.

On the outer side of the disk $b^{16}$ is a compression plate $b^{17}$ for coupling the driving gear to the power transmitter loosely mounted at $b^{18}$ on an annular flange or hub of the power carrier $b^9$ and provided with a series, herein shown as four, of slightly inclined projections $b^{19}$. Coöperating with the projection $b^{19}$ are a corresponding number of levers $b^{20}$ whose rolls $b^{21}$ engage said inclined projections and the opposite rolls $b^{22}$ thereof are engaged by the conical spreaders $a^9$ of the clutch mechanism, the latter being preferably provided with grooves or dwells $a^{21}$ for maintaining the clutch clamped. A plate $b^{23}$, corresponding to the plate $b^{17}$ is provided at the opposite side of the gearing and has similar inclined projections $b^{19}$ and coöperating levers $b^{20}$ and rolls $b^{21}$, $b^{22}$ operated by the spreader $a^{10}$. The levers $b^{20}$ are pivotally carried on studs $b^{24}$ projecting from the power carrier $b^9$ through the respective plates $b^{17}$, $b^{23}$, as clearly shown in Fig. 8, and secured by lock nuts $b^{25}$, said plates being normally held outward by springs $b^{26}$, Fig. 4.

Opposite the high speed gear $b^{12}$ is a low speed gear $b^{27}$ also loosely journaled on the power transmitter or carrier $b^9$ and engaged externally by a pinion $b^{28}$ on a shaft $b^{29}$, the latter also carrying fast therewith a pinion $b^{30}$ which drives the high speed gear. The pinion $b^{28}$ engages the low speed gear $b^{27}$ which is also provided with internal teeth $b^{31}$ engaged by a series of pinions $b^{32}$, four thereof being herein shown, carried by a spider or annular carrier $b^{33}$ which, when moved by the clutch to rotate with the power transmitter, actuates the latter at slow speed, and when held against movement with said power transmitter serves to reverse the rotation. For the latter purpose I provide said spider with an outwardly projecting annular flange $b^{34}$ to receive a reversing device herein shown as a brake strap $b^{35}$. An inwardly projecting radial flange $b^{36}$ is provided for forward slow speed movement, having opposite flat sides engaged by fiber rings or plates $b^{37}$, $b^{38}$ which act the same as the before mentioned fiber plates or disks $b^{15}$, $b^{16}$, said ring or plate $b^{37}$ engaging the outer face of a radial web $b^{40}$ or a gear $b^{41}$ in mesh with the series of pinions $b^{32}$. The gear $b^{41}$ and web $b^{40}$ are integral with or secured immovably to the power transmitter $b^9$.

From the foregoing description it will be seen that both the speed gears $b^{12}$ and $b^{27}$ rotate continuously in the same direction and when the clutch is moved to the right, Fig. 4, the high speed gear $b^{12}$ is caused thereby to transmit forward driving movement through the power transmitter $b^9$ to the shaft $a$ and when said clutch is moved to the left, the low speed gear $b^{27}$ through the intermediate pinions $b^{32}$, spider $b^{33}$ and gear $b^{41}$ transmits forward movement at slow speed to said shaft through said power transmitter, the gear $b^{41}$ and spider $b^{33}$ being then held relatively immovable so that the pinions $b^{32}$ are locked against rotation, and hence transmit the forward motion of the gear $b^{27}$ directly to the shaft. If now the actuating spreaders are moved to an intermediate position so that the clutch is neither in the high speed position nor in the low speed position, and the reversing lever is pulled thereby applying the brake $b^{35}$ to the spider $b^{33}$ and stopping the latter, the forward rotation of the gear $b^{27}$ then immediately rotates the pinions $b^{32}$ and they in turn drive the gear $b^{41}$ in a direction opposite to that of the gear $b^{27}$, and, inasmuch as said gear $b^{41}$ is rigid with the power transmitter, the latter is caused to transmit reverse driving motion to the shaft $a$.

The shaft $b^{29}$ receives power from a pinion $b^{45}$ on the crank shaft $b^{46}$ of the engine, meshing with gear $b^{30}$. The crank shaft $b^{46}$, also carries adjacent its outer end a balance wheel $b^{47}$ and beyond the latter a suction fan $b^{48}$ for ventilating purposes, as will presently be described.

Between the high speed and low speed gears $b^{12}$, $b^{27}$, the periphery of the power transmitter $b^9$ is turned down to provide a brake surface $b^{49}$ against which may be clamped opposite brake shoes $b^{50}$, herein shown, Fig. 11, as provided with ribs $b^{51}$ for strength, and adjustably connected at one end by a bolt $b^{52}$ and spring $b^{53}$ and at their other ends by pivoted links $b^{54}$ eccentrically connected at $b^{55}$ to intermeshing gears $b^{56}$ turning on shafts $b^{57}$, one of which extends externally of the housing, as shown in Figs. 1 and 2, and is provided with a crank $b^{58}$ actuated by an operating rod $b^{59}$.

The reversing mechanism is actuated by an operating rod or lever $b^{60}$ pivoted to a crank $b^{61}$.

As already explained, a leading object of my invention is to have the gearing mounted on and surrounding the driving axle and connected therefrom by a housing in such a manner that the apparatus is oil tight and dust proof, and for this purpose the casing, as best shown in Figs. 1—3, comprises a substantially circular shell $c$ shown as made in two parts joined along the line $c'$ about the axle, the chamber of this shell opening into an intermediate gear case $c^2$ in which is mounted the engine shaft and gearing connected therewith, said intermediate gear case $c^2$ opening at its forward end into a crank case $c^3$. At the upper end of the crank case $c^3$ is the engine cylinder $c^4$ receiving its charge from a carbureter (not shown) through an opening $c^5$.

A shell $c^6$ incloses the cylinder and cylinder head $c^7$ and valve chamber (not shown) a usual valve gear case $c^8$ being provided on the crank case $c^3$, and an exhaust muffler and other usual accompaniments of this kind of apparatus, but inasmuch as they do not constitute part of my invention they are not herein shown.

From the foregoing description it will be seen that oil placed in the apparatus at any convenient point as at $c^9$ in the crank case, will be distributed to all necessary parts of the entire apparatus by the action of the mechanism itself and inasmuch as all the latter is contained within practically one housing or casing, the apparatus is oil proof. This result is made possible partly by reason of the fact that the gearing is gathered in one confined space, that space being preferably about the rear axle of the vehicle.

For convenience the casing is made in a plurality of parts but it is nevertheless practically one casing. This taken in connection with the automatic cooling of the parts, (described and claimed in my co-pending application, Ser. No. 236,813), renders it practically unnecessary to inspect or get at the operating parts of the apparatus.

The cooling apparatus is so arranged that it applies the greatest cooling effect to those parts most liable to get heated and for this purpose is made in the form of a down draft which may be operated by any suitable means, the draft being herein shown as caused by an exhaust fan $b^{48}$ at the rear of the fly wheel $b^{47}$ fixed to the engine shaft $b^{46}$ so that it is always pulling a strong draft of air down through the cylinder casing, a passage way $c^{10}$ being provided through the intermediate case $c^2$ from an annular passage $c^{12}$ at the base of the cylinder shell opening into the latter by a series of holes $c^{13}$.

The chamber within the cylinder shell is divided in a series of vertical compartments by vertical radial ribs $c^{13}$ formed around the cylinder and opening at their upper ends to the outer air through openings $c^{15}$ in the shell.

In general the operation of my apparatus is as follows: The moment the engine is started, the entire operating mechanism including all the pinions and gears and bearings which need lubrication are thoroughly oiled automatically and are kept properly oiled, while at the same time a multitude of small streams of cold air is pouring down through the cylinder casing $c^6$ on the parts which would otherwise become overheated, and the faster the engine runs, the greater is the inrush of this cold air, which is compelled to keep up a continuous circulation as long as the engine operates. As the crank shaft $b^{46}$ rotates, it drives the pinions $b^{28}$, $b^{30}$, which are respectively in mesh with the slow speed gear $b^{27}$ and the high speed gear $b^{12}$. When the operator gets ready to go ahead, he pushes forward on the operating rod $a^{16}$, through the bell crank $a^{14}$, shifting the spreader $a^9$ to the right, Fig. 4, and simultaneously spreading apart the levers $b^{20}$ causing their outer free ends to ride upwardly on the inclines $b^{19}$ of the compression plate $b^{17}$, thereby moving the latter tightly against the fiber washer or disk $b^{16}$ and compressing the latter and disk $b^{15}$ into driving contact with the power transmitter $b^9$ which, through its contained differential gearing drives the shaft $a$ forward at high speed. By the term "power transmitter" I do not restrict myself to any particular form but include any means for transmitting driving motion to the axle. If now the operator wishes to stop, and back his motor-carriage, he shifts the spreader $a^9$ to the left so as to release the levers $b^{20}$ from their pressing engagement on the plate $b^{17}$ and, then retracts the rod $b^{60}$, thereby tightening the strap $b^{35}$ on the flanged pinion carrier $b^{33}$ so as to stop the latter, thereby causing the slow speed gear $b^{27}$ through engagement of its internal teeth $b^{31}$ with the pinions $b^{32}$ to drive the gear $b^{41}$ in a reverse direction, thereby transmitting, through the differential gearing, a reverse action to the shaft $a$. When the operator wishes to climb a steep hill or for other reasons desires to have more power and less speed he pulls back on the rod $a^{16}$, thereby moving the bell crank $a^{14}$ so as to shift the slide rod $a^7$ to the left, Fig. 4, and actuate the spreader $a^{10}$ to separate the levers $b^{20}$ of the compression plate $b^{23}$ so as to force the latter and the fiber rings or plates $b^{37}$, $b^{38}$ and web $b^{36}$ of the pinion carrier $b^{33}$ into immovable engagement with the power transmitter $b^9$, the result being that the slow speed gear $b^{27}$ through the engagement of its internal teeth $b^{31}$ with the now immovable pinions $b^{32}$ drives forward the shaft at slow speed. If now, it is desired to stop the machine gently, the operator shifts the rod $a^{16}$ forward again until the spreader $a^{10}$ is in a neutral position and simultaneously therewith he pulls on the rod $b^{59}$, thereby instantly setting the brake shown in Fig. 11 and stopping the vehicle. And if this should happen on a down hill or wherever an extra brake is required, he can transform the reversing mechanism into an auxiliary brake and obtain the full force of the engine or any degree thereof desired, simply by retracting the rod $b^{60}$ more or less according to the degree of braking force desired to be secured from the reversing mechanism. This is rendered practicable by reason of the fact that my reversing mechanism is of the friction character, the hard fiber plates making it possible to maintain its hold without roughening them, or on the other hand, to permit a slight slipping thereof without material injury.

Providing the driving mechanism of my apparatus with metal or fiber or other substance dissimilar to the metal brought into frictional contact with each other, is another important and novel feature, especially when used in connection with the oiling feature which maintains said surfaces running more or less in oil. Not only do these dissimilar contacting surfaces in the construction above explained, prevent roughening and rapid wear, but they give large area, the high speed gear having this frictional area as near the pheriphery as possible, thereby giving the largest leverage and frictional contact practical with compact construction, so that when the clutch is closed, there is very little possibility of the parts slipping. This provision of having very large friction surfaces is also an important feature of novelty, as it enables me to get all speeds simply by permitting the surfaces to slip more or less according to the speed desired.

In some devices it has been considered necessary to have quite a number of change speed gears, necessitating a very complicated mechanism, but I accomplish all the desired results simply by providing the large frictional surfaces which makes it feasible to clamp them immovably or permit slight or large amount of slipping of one relatively to the other as desired. The fiber plates running in oil aid materially in securing this result. Another important advantage resulting from the same features is that there is never any quick and unpleasant jerk and strain brought upon the vehicle when the clutch is thrown in.

The plurality of levers $b^{20}$, preferably four, riding up gentle inclines at one end and spread powerfully by the gently sloping cones or spreaders gives not only powerful compression with slight exertion on the part of the operator but also permits the ready maintenance of the apparatus set wherever the operator has moved it, the slight depressions or dwells being preferably provided however for aiding this result. It will be noted also that the construction is such that there is practically no wear on the spreading mechanism or clutch, as when the spreader has locked the clutch in operative position the levers $b^{20}$ and the spreader with which they engage, as also the compression plate, are all revolving together.

Whenever the shaft or axle $a$ is rotated, the power transmitter $a^9$ through which it is rotated, carries with it both compression plates and the two sets of levers $b^{20}$ while the shaft itself carries the coöperating spreaders, the result being that there is practically no wear possible between these clutch members, all the wear coming between the fiber members and the metal frictional surfaces with which they engage. This construction not only gives durability but makes it feasible to exert great and sudden spreading pressure without any danger whatever to the clutch.

While I have undertaken above to set forth the leading advantages of my invention, as at present apprehended by me, other advantages will occur to those skilled in the art and I also wish it understood that I am not restricted to the constructional details herein presented, excepting as they may be specified in certain of the claims, as many changes in form, arrangement and combination of parts may be resorted to without departing from the spirit and scope of my invention.

I have herein shown and described certain clutch mechanism and brake mechanism which is not herein claimed, but is reserved for another application.

Having described my invention, what I claim as new and desire to secure by Letters Patent, is:—

1. Driving mechanism for a motor-vehicle, comprising an axle, a power transmitter mounted thereon, two gears carried by said axle for operating said transmitter, and clutching mechanism including two actuating means, located at the opposite sides of said transmitter and connected together at the axle for coupling one or the other of said gears and said transmitter as desired and a single operating device for said two connected actuating means.

2. Driving mechanism for a motor-vehicle, comprising an axle, a power transmitter mounted thereon, two gears carried by said axle for operating said transmitter, and clutching mechanism including actuating means movable longitudinally in contact with said axle for coupling one or the other of said gears to said transmitter as desired.

3. Driving mechanism for a motor vehicle, comprising an axle, a power transmitter, and two gears for driving the latter, both concentric of said axle, and clutching mechanism for coupling one or the other of said gears to said transmitter, and two connected actuating means located co-axially of the concentric mechanism for operating said clutching mechanism.

4. Driving mechanism for a motor vehicle, comprising an axle, a power transmitter, a high speed gear separate from said transmitter, at one side of the latter and concentric to said axle, a low speed gear also separate from said transmitter, at the other side of the latter and concentric to said axle, said power transmitter extending out radially between said two concentric gears and the latter having radially extending frictional driving surfaces, and frictional clutching mechanism movable longitudinally of the axle for laterally engaging each of said concentric gears.

5. Driving mechanism for a motor vehicle, comprising an axle, a power transmitter, a high speed gear at one side of said transmitter and concentric to said axle, a low speed gear at the other side of said transmitter and also concentric to said axle, said two concentric gears having radial friction surfaces, and said transmitter having coöperating radial friction surfaces, a brake operating on said transmitter between said two gears, and clutch mechanism for frictionally coupling at will either of said gears with said transmitter during the running of the axle.

6. Driving mechanism for a motor-vehicle, comprising an axle, a power transmitter, a high speed gear at one side of said transmitter and concentric to said axle, a low speed gear at the other side of said transmitter and also concentric to said axle, a brake operating on said transmitter between said two gears, and frictional clutching mechanism for each of said gears.

7. Driving mechanism for a motor-vehicle, comprising an axle, a power transmitter, a high speed gear at one side of said transmitter and concentric to said axle, a low speed gear at the other side of said transmitter and also concentric to said axle, and means coöperating with one of said gears for reversing the driving movement thereof on said axle.

8. Driving mechanism for a motor-vehicle, comprising an axle, a power transmitter, a high speed gear at one side of said transmitter and concentric to said axle, a low speed gear at the other side of said transmitter and also concentric to said axle, and means including a frictional device coöperating with one of said gears for reversing the driving movement thereof on said axle, said means being convertible into a friction brake.

9. Driving mechanism for a motor-vehicle, comprising an axle, a power transmitter mounted thereon, an annular gear provided with external means for receiving power and with internal teeth for transmitting power, a concentric gear within said annular gear for transmitting movement to said power transmitter, a pinion engaging said concentric gear and said internal teeth, an annular member carrying said pinion, and clutching mechanism for coupling said member to said concentric gear.

10. Driving mechanism for a motor-vehicle, comprising an axle, driving mechanism at said axle, an engine shaft, gearing connecting the latter with said driving mechanism, a crank case, an intermediate case for said shaft, and a case for said axle and driving mechanism, said three cases opening into each other to constitute one compartment for the free transmission of oil, and affording a tight and oil proof connected housing for all the aforesaid mechanism.

In testimony whereof, I have signed my name to this specification, in the presence of two subscribing witnesses.

ALFRED B. MORSE.

Witnesses:
A. T. VAN HORN,
GEO. H. MAXWELL.